Patented May 4, 1937

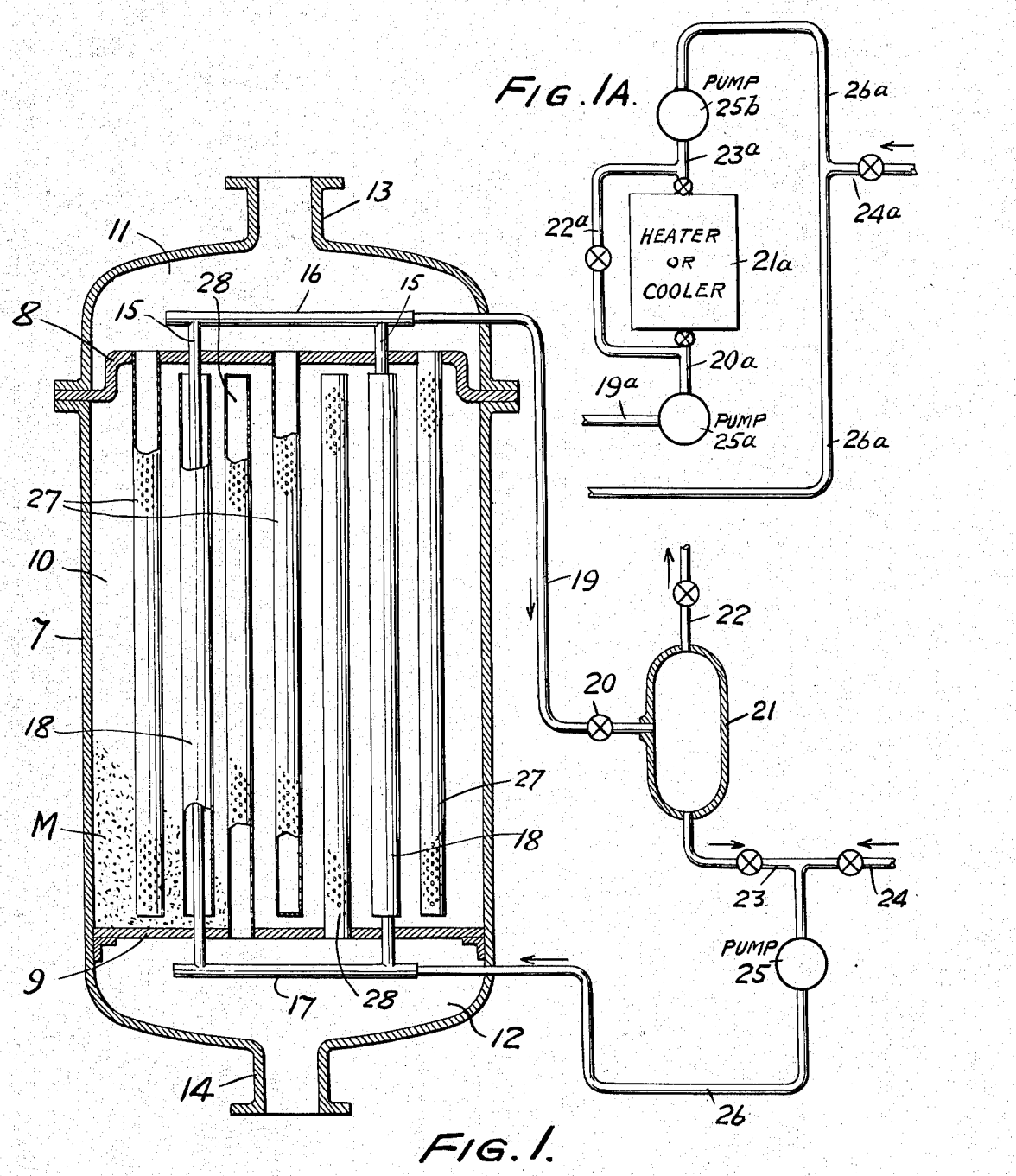

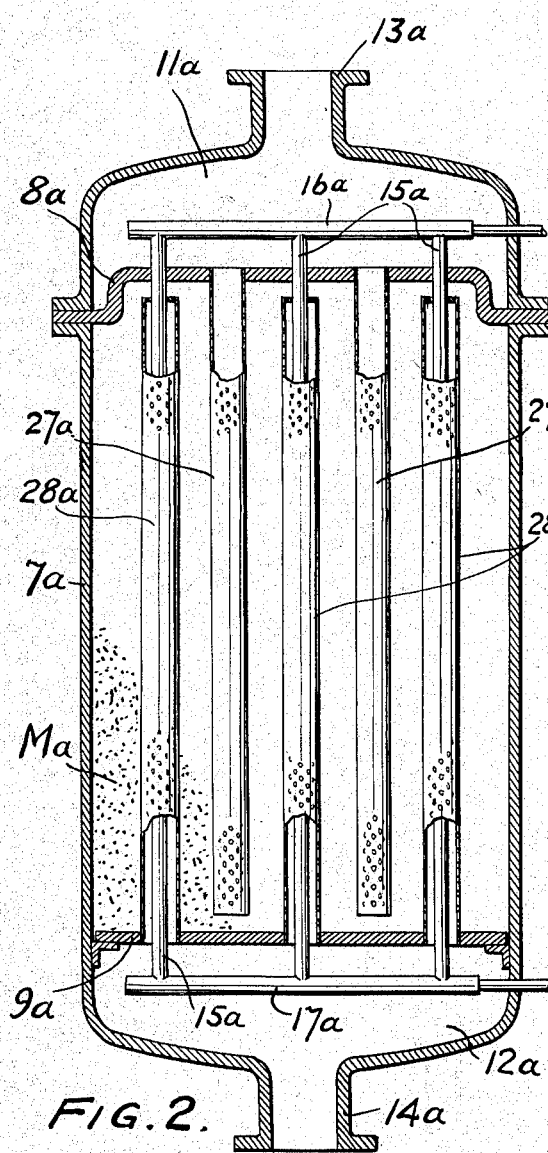
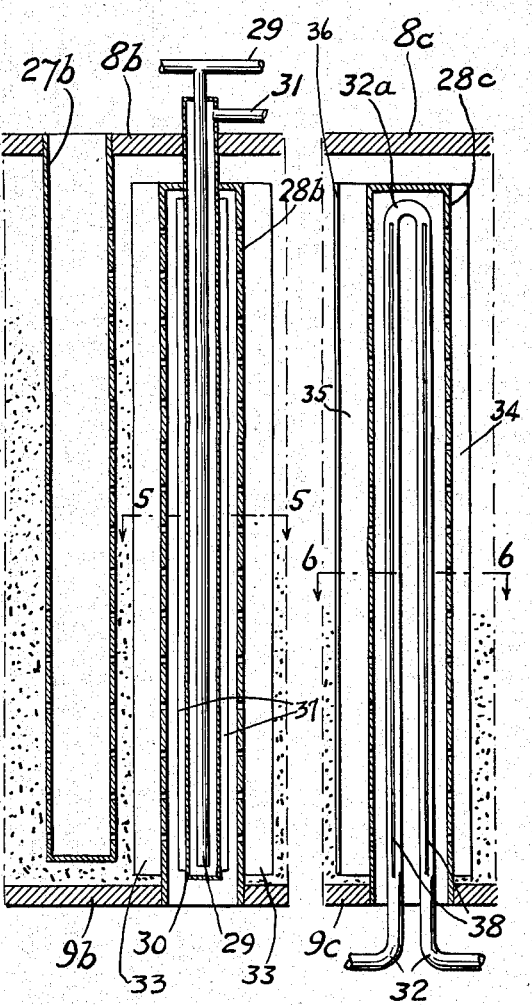
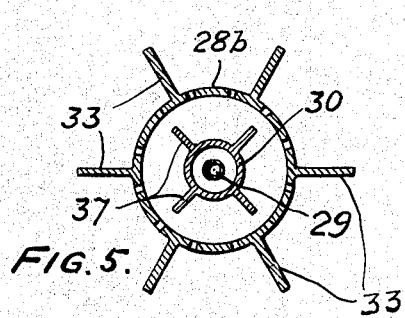
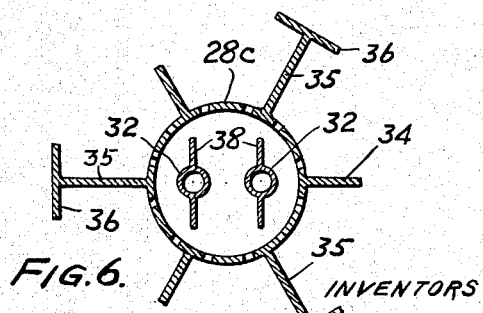

2,078,947

UNITED STATES PATENT OFFICE 2,078,947

TEMPERATURE REGULATION OF CONVERTERS

Eugene J. Houdry, Philadelphia, Pa., and Raymond C. Lassiat, Woodbury, N. J., assignors to Houdry Process Corporation, Dover, Del., a corporation of Delaware Application June 1, 1934, Serial No. 728,544

14 Claims. (Cl. 23—288)

This invention relates in general to heat exchange and more particularly to apparatus adapted for use in the control or regulation of the reaction temperatures of contact masses.

One object of the invention is to impart heat to or remove heat from a contact mass at a rapid but controlled rate. Another object is to effect the heat exchange in a substantially uniform manner throughout the depth of the mass. Another object is to make the heat exchange largely by radiation. Other objects will be apparent from the detailed description which follows.

The invention involves passing a heat exchange fluid through a contact mass so as to heat or cool the same in a substantially uniform manner. The fluid may be either gaseous or liquid. Transfer of heat by conduction is minimized, preference being given to radiation. In certain cases convection may play a part in the heat transfer. While the conduits for the heat exchange fluid extend within the contact mass, they are preferably kept out of contact with the latter by the interposition of spacing means of any suitable type such for example as an outer member or conduit which may or may not be perforated or apertured. If the outer member is apertured, some of the heat exchange between the mass and the fluid will be by convection. Such an apertured outer member enables the heat exchange unit to serve also as means for distributing reactant fluids within the mass or for removing the products of the reaction from within the mass.

In order to illustrate the invention and the manner of its operation, concrete embodiments thereof are shown in the accompanying drawings, in which:

Fig. 1 is a vertical sectional view through a converter and showing one form of circuit for the heating or cooling medium;

Fig. 1a is supplemental to Fig. 1, and illustrates a portion of another type of circuit for the heating or cooling medium, the converter being omitted;

Fig. 2 is a vertical sectional view of a converter similar to that shown in Fig. 1, but indicating a modification of the heating or cooling arrangement for the contact mass;

Figs. 3 and 4 are fragmentary vertical sectional views on an enlarged scale showing additional modifications; and Figs. 5 and 6 are transverse sectional views on the lines 5—5 and 6—6 of Figs. 3 and 4, respectively.

The converter disclosed in Fig. 1 comprises an outer shell 7 divided on its interior by upper and lower perforated partitions 8 and 9, respectively, to provide a large central reaction chamber 10 and upper and lower chambers 11 and 12, respectively, the latter having connections 13 and 14, respectively, to the exterior of the converter. Reaction chamber 10 is filled with a contact mass M which may be mere spreading material or which may have catalytic or adsorptive properties capable of effecting the desired conversion of the selected starting material. If the converter is used for the transformation or modification of hydrocarbons, such, for example, as the conversion of high boiling forms of petroleum or the like into low boiling hydrocarbons, the contact mass may comprise pieces or fragments of a ceramic material which has adsorptive properties, or it may be prepared in molded pieces of substantially uniform size containing or impregnated, if desired, with other active substances, such as finely divided metals or metallic oxides. By preference, the converter is arranged for regeneration of the contact mass in situ by oxidation so that the reactions taking place in chamber 10 will be alternately endothermic and exothermic.

To effect control of the temperature of the contact mass, especially during the exothermic operation, so that the mass will not be impaired or destroyed through overheating, the invention involves extracting a large amount of the liberated heat by radiation to a circulated cooling medium, water, for example. For this purpose, imperforate conduits 15 are embedded in the contact mass and extend through certain of the perforations in partitions 8 and 9 to connect with headers 16 and 17 disposed above and below the reaction chamber, as in upper and lower chambers 11 and 12, respectively. To keep mass M out of direct contact with pipes 15, so that the transfer of heat will be predominately by radiation, suitable members 18 are mounted on pipes 15 so as to enclose that portion of the same which is within reaction chamber 10. Members 18 are preferably tubular, of greater diameter than the pipes, and imperforate, although they may be perforate as will later appear. Upper header 16 has a connection 19 provided with a pressure reducing valve 20 which opens into a flashpot 21. Vapor may be released from flashpot 21 by a valve controlled connection 22 at its top, while condensate from the bottom of the flashpot is conducted by line 23 along with additional makeup material from valved supply line 24 to pump 25 which sends the cooling medium by connection 26 to lower header 17. The cooling medium in that part of the circuit which lies between pump 25 and flashpot 21 is maintained under sufficient pressure to keep it in liquid state or substantially in liquid state while picking up heat in pipes 15 and until it reaches release valve 20.

If the circulated medium is to be used for heating as well as cooling, it may be preferable to use a gaseous medium. Details of that portion of a circuit outside of the converter for a medium which is either liquid or gaseous are disclosed in Fig. 1a, where connection 19a from upper header 16 of converter 7 leads to a pump 25a connected by line 20a to an apparatus 21a, capable of functioning either as a heater or cooler, from which another connection 23a leads to a second pump 25b connected by a line 26a to the lower header 17 of the converter. The heating or cooling medium may be introduced into the circuit by a valved connection 24a. Heater or cooler 21a may be bypassed in whole or in part by a valved connection 22a between lines 20a and 23a. Either or both pumps 25a and 25b may be operated and the fluid may be circulated in either direction.

While the reactant fluids fed to converter 7 may be passed directly through reaction chamber 10 from end to end, from either of chambers 11 or 12, and the products of the reaction removed from the other of such chambers, more satisfactory and uniform results are obtained by a uniform parallel flow arrangement within reaction chamber 10, after the manner disclosed in the copending application of Eugene J. Houdry, Serial No. 611,362, filed May 14, 1932, now Patent 2,042,468 issued June 2, 1936. To this end, the perforations for the reactant fluids in partitions 8 and 9 are made of sufficient size to mount therein, by a threaded arrangement or otherwise, series of perforated conduits 27 and 28, respectively, these conduits extending into reaction chamber 10 and being embedded in contact mass M in uniformly spaced, parallel and symmetrical arrangement. One series, such as 27, may be used for the distribution of reactant fluids from upper chamber 11 within and throughout the interior of contact mass M, while the other series, 28, uniformly withdraws the products of the reaction from within contact mass M and discharges the same into lower chamber 12.

Instead of heating or cooling the contact mass by separate elements disposed in the reaction chamber, such as units 15, 18 of Fig. 1, it is possible to simplify the structure of the converter by combining or incorporating the heating or cooling units with or into certain of the perforated distributing or outlet conduits, as illustrated in various ways in Figs. 2 to 6, inclusive. In such combination forms, the perforated distributing or collecting element is substituted for the imperforate enclosing member 18 of the embodiment shown in Fig. 1.

Fig. 2 discloses a converter similar to that shown in Fig. 1 and like parts are indicated by the same reference characters with the addition of the letter a. In this form of the invention, the pipes 15a which extend between headers 16a and 17a are shown as passing centrally within and through the perforated conduits 28a, with the result that heat transfer between the heating or cooling pipes 15a and contact mass Ma is both by radiation and convection instead of predominately only by radiation as in the form shown in Fig. 1. When pipes 15a are used to impart heat to contact mass Ma, as during an endothermic reaction, the movement of the reactant fluids may be in either direction, but if they enter lower chamber 12a of converter 7a they will pass into perforated conduits 28a, thence into contact mass Ma, thence through perforations in the nearest conduits 27a, and thence into upper chamber 11a. When pipes 15a are used for cooling, as in an exothermic reaction, it is preferable that the reactant fluids be fed into upper chamber 11a, thence distributed by conduits 17a into mass Ma, and the products leave by perforated conduits 28a. Mass Ma then gives up its heat directly to conduits 28a, and thence by radiation to pipes 15a and indirectly by convection as the products of the reaction pass over pipes 15a in their movement into lower chamber 12a.

Instead of passing the heating or cooling medium through the contact mass from end to end, with headers for the medium above and below the reaction chamber, Figs. 3 and 4 show modified forms in which both headers are either above or below the reaction chamber, and the heating or cooling medium makes a reverse movement within the reaction chamber. In Fig. 3, the heating or cooling means extending within perforated conduit 28b comprise double or nested pipes. The inner pipe 29 of this unit connects with a supply header (not shown), and extends to the lower end of the unit, where it discharges the fluid into the bottom of the outer enclosing pipe 30. Thereupon the fluid reverses its movement, passing back around the exterior of pipe 29, and leaving at the top of the unit by pipe 31 which connects with the outlet header (not shown). In Fig. 4, the heating or cooling unit comprises a single pipe 32 bent in a loop to pass within perforated conduit 28c from either end, in this instance from the lower end. Pipe 32 has a reverse bend 32a disposed adjacent the end of perforated conduit 28c, remote from the end entered by pipe 32, the latter accordingly having portions extending in opposite directions and in parallelism. One end of reversely bent pipe 32 connects with the inlet header, while the other end connects with the outlet header (such headers not shown).

To effect greater movement of heat between the enclosing member and the contact mass, the former may be provided with fins extending radially into the contact mass. Figs. 3 and 5 disclose a series of axially directed fins 33 extending radially into the contact mass from outer perforated member 28b. Figs. 4 and 6 show elements of a similar character arranged on outer enclosing perforated member 28c, but, in this instance, the fins differ in axial projection, short fins 34 alternating with longer fins 35, the long fins being provided with transverse members 36 at their outer ends to secure an even greater amount of heat transfer. Similarly, the pipes conducting the heating or cooling medium may be formed with an extended surface to increase the transfer of heat by radiation or by radiation and convection. In Figs. 3 and 5, the outer pipe 30 is shown with a series of fins 37, while in Figs. 4 and 6 the reverse portions of pipe 32 within outer conduit 28c are provided with aligned fins 38. It is to be understood that fins or the equivalent may be similarly applied to the heating or cooling units shown in Figs. 1 and 2. To produce the maximum radiating effect between the inner faces of the outer enclosing members and the outer faces of the pipes for the heating or cooling fluids, the invention contemplates making all such opposed surfaces or faces "black".

With a once-through use of the heating or cooling medium, in accordance with the forms of the invention disclosed in Figs. 1 and 2, it is necessary to have a relatively fast rate of flow and a relatively small pickup or giving up of heat per unit of weight of circulated fluid to effect substantially uniform heat exchange throughout the depth of the contact mass, except that when change of state of the circulated fluid is involved, the exchange of heat per unit of circulated fluid can be greatly accelerated. With the reverse or double movement of heating or cooling fluid, as indicated in the modifications shown in Figs. 3 and 4, temperature equalization in the fluid stream is effected, and there can be a much greater pickup of heat per unit of weight of circulated fluid. In practical applications of the invention, it is necessary to adjust the rate of flow to suit the requirements of the particular apparatus used and the character of the reaction involved.

For a liquid cooling medium, water is the preferred material, but other materials can be used. For example, under certain conditions, it may be desirable to raise the boiling point of the cooling medium by other means than to increase the operating pressure, in which case a salt solution or the like may be used in place of water. For the gaseous heating or cooling medium, any desired gaseous fluid may be used. It is preferable, however, to avoid one which would make an explosive mixture with the materials undergoing reaction in case of a break in the connections. Nitrogen will usually fit the requirements, but in many instances a cheaper medium, such as air, can be used.

While the invention has been herein disclosed in certain preferred forms, it is to be understood that the invention is not confined to the specific details thereof, but covers all variations, adaptations, and modifications within the scope of the appended claims.

We claim as our invention:

1. In the control of chemical reactions effected by the aid of solid contact material, wherein temperature control within some particular range is desirable, the process which comprises disposing the contact material in a deep bed, passing a temperature-controlled fluid medium in a plurality of confined streams spaced one from another directly through said bed, maintaining a liquid- and solid-free space of substantially equal width around each of said streams and between the same and the surrounding bed of contact material, keeping said space out of fluid conducting relation with said contact material so as to effect heat exchange across said space primarily by radiation, and passing the fluid to be treated into contact with said bed and withdrawing the products of the resulting reaction.

2. In the control of chemical reactions effected by the aid of solid contact material, wherein temperature control within some particular range is desirable, the process which comprises disposing the contact material in a deep bed, passing a temperature controlled fluid medium in a confined stream directly through said bed to effect heat exchange therewith, providing a solid-free space surrounding said confined stream, introducing a fluid to be treated into contact with said bed, and withdrawing treated fluid therefrom through said space surrounding said confined stream and located between it and the surrounding bed of contact material.

3. The combination with a deep bed of solid contact material for effecting chemical reactions, either exothermic or endothermic, of a heat exchange unit embedded in said material, said unit comprising nested but spaced imperforate conduits, the inner conduit for conducting a fluid medium for cooling or heating said material, the outer conduit being in direct contact with said material but out of fluid conducting relation with and in spaced relation to said inner conduit, thus forming a liquid- and solid-free space about the latter whereby heat exchange is effected with said inner conduit largely by radiation.

4. The combination with a contact mass for effecting chemical reactions of a perforated conduit embedded in said mass for venting fluid from said mass and an imperforate conduit for a heat exchange medium extending within and the full length of said perforated conduit, said conduits being mounted so as to minimize metallic engagement with one another and to provide a free annular space therebetween for the venting and passage of fluids from said mass.

5. The combination with a contact mass for effecting chemical reactions of a perforated conduit embedded in said mass for admitting fluid to or venting fluid from said mass, heat exchange means extending through said mass in spaced relation to said conduit and in substantial parallelism therewith, and a substantially imperforate member enclosing said last named means to keep the same out of contact with said mass and to provide an intervening liquid- and solid-free space thereby to limit heat exchange between said means and said mass primarily to radiation.

6. In apparatus for effecting chemical reactions, a converter having a reaction chamber, a contact mass in said chamber, series of perforated conduits embedded in said mass in uniform symmetrical arrangement for admission of reactants and venting of the products of the reaction, means also embedded in said mass intermediate said series of conduits for restricting heat exchange substantially to radiation alone between a heating or cooling medium and the interior of said mass, said means comprising conduits for said medium and members enclosing said last named conduits and providing liquid- and solid-free spaces between said last named conduits and said mass.

7. In apparatus for effecting chemical reactions, a converter providing a reaction chamber, inlet and outlet means for the reactants and reaction products respectively, a contact mass in said chamber, a series of perforated conduits embedded in said mass for distributing fluids within said mass, said perforated conduits forming part of said inlet means, additional conduits in parallelism with said perforated conduits for directing a heating or cooling medium through a part of said converter, and means enclosing said additional conduits and spaced therefrom to prevent contact of said mass therewith, the latter said means being out of communication with the reactant inlet means thus serving to keep incoming reactants out of the space enclosed by said enclosing means.

8. In apparatus for effecting chemical reactions, a converter having a reaction chamber, a deep bed of contact material in said chamber, means comprising perforated conduits embedded in said material for admitting reactants to said chamber and for withdrawing the products of the reaction therefrom, means for circulating a heating or a cooling medium through at least a part of said chamber including conduits therefor extending into said chamber in spaced parallelism with said perforated conduits and surrounded by said contact material, and means enclosing and spaced from said heat exchange conduits to keep said material out of direct contact with the same and to provide intervening gas spaces.

9. In apparatus for effecting chemical reactions, a converter having a reaction chamber, a contact mass in said chamber, means for admitting reactants to said chamber and for withdrawing the products of the reaction therefrom, at least a part of said means comprising perforated conduits embedded in said mass for venting fluid products therefrom, and means within said converter forming part of a circuit for an independent cooling medium, said last named means including conduits telescoped within said perforated conduits and spaced therefrom out of heat conducting relation therewith, thereby to provide spaces for the vented products to pass thereover but otherwise restricting heat exchange with said mass to radiation.

10. A converter for effecting exothermic and endothermic reactions comprising a casing providing a reaction chamber, a contact mass therein, means for sending reactants into said chamber, an apertured outlet conduit embedded in said mass, means associated with said conduit for passing a cooling or heating medium therethrough out of direct contact with said mass and with the products of the reaction, and means for conducting heat between said conduit and said mass.

11. A converter for effecting exothermic and endothermic reactions comprising a casing providing a reaction chamber, a contact mass therein, means for sending reactants into said chamber, a series of apertured outlet conduits embedded in said mass, means associated with the individual members of said outlet series for passing a cooling or heating medium therethrough out of direct contact with said mass and with the products of the reaction, and means for conducting heat between said series of said outlet conduits and said mass.

12. A converter for effecting exothermic and endothermic reactions comprising a casing providing a reaction chamber, a contact mass therein, a series of apertured distributing conduits and a series of apertured outlet conduits embedded in said mass, means associated with individual members of said outlet series for passing a cooling or heating medium therethrough out of direct contact with said mass and with the products of the reaction, and means for conducting heat between said last named means and said mass.

13. The combination with a contact mass for effecting chemical reactions of a perforated conduit embedded in said mass for admitting fluid to or venting fluid from said mass, and an imperforate conduit for a heating or cooling medium extending within and spaced from said perforated conduit and in substantially non-contacting relation therewith, said imperforate conduit having projecting members thereon to increase the radiating surface thereof, said members extending into the space between the said conduits to promote heat exchange by radiation and convection between said mass and said medium.

14. The combination with a contact mass for effecting chemical reactions, a conduit extending through said mass for circulating a heating or cooling fluid, a member enclosing said conduit and in spaced relation thereto for engaging the contact mass and for keeping the latter out of contact with said conduit, fins radiating from said member into said mass to increase the area of contact therewith, and fins extending from said conduit into the space between the latter and said member to increase the radiating surface thereof.

EUGENE J. HOUDRY.
RAYMOND C. LASSIAT.